United States Patent
Hong et al.

(10) Patent No.: US 10,331,700 B2
(45) Date of Patent: Jun. 25, 2019

(54) SYSTEM, METHOD, AND APPARATUS FOR DYNAMICALLY REPLICATING DATA FOR HETEROGENEOUS HADOOP

(71) Applicant: Foundation of Soongsil University-Industry Cooperation, Seoul (KR)

(72) Inventors: Jiman Hong, Seoul (KR); Daeshin Park, Seoul (KR); Kisu Kim, Seongnam-si (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 325 days.

(21) Appl. No.: 15/359,263

(22) Filed: Nov. 22, 2016

(65) Prior Publication Data

US 2017/0169088 A1    Jun. 15, 2017

(30) Foreign Application Priority Data

Dec. 10, 2015   (KR) .................. 10-2015-0175832

(51) Int. Cl.
*G06F 16/27* (2019.01)
*G06F 9/50* (2006.01)

(52) U.S. Cl.
CPC .......... *G06F 16/275* (2019.01); *G06F 9/5005* (2013.01); *G06F 16/27* (2019.01)

(58) Field of Classification Search
CPC .................. G06F 17/30575; G06F 16/27
See application file for complete search history.

(56) References Cited

U.S. PATENT DOCUMENTS

| | | | |
|---|---|---|---|
| 9,747,127 B1* | 8/2017 | Florissi | ............ G06F 17/30067 |
| 2014/0059310 A1* | 2/2014 | Du | ......................... G06F 3/065 |
| | | | 711/162 |
| 2014/0310712 A1* | 10/2014 | Meng | ................... G06F 9/5066 |
| | | | 718/102 |
| 2014/0358977 A1 | 12/2014 | Cramer et al. | |

(Continued)

FOREIGN PATENT DOCUMENTS

| | | |
|---|---|---|
| JP | 2015-022327 A | 2/2015 |
| KR | 10-2012-0004463 A | 1/2012 |
| KR | 10-1432745 B1 | 8/2014 |

(Continued)

OTHER PUBLICATIONS

Article entitled "An Efficient Hadoop Data Replication Method Design for Heterogeneous Clusters", by Park et al., dated Apr. 8, 2016.*

(Continued)

*Primary Examiner* — Mahesh H Dwivedi
(74) *Attorney, Agent, or Firm* — Novick, Kim & Lee, PLLC; Sang Ho Lee

(57) ABSTRACT

A system for dynamically replicating data for a heterogeneous Hadoop is provided. The system includes a name node having a replication manager. The replication manager calculates a probability that a map task is allocated to a map task slot of a data node that stores an input data block of the map task out of a plurality of map task slots of data nodes by using a number of the map task slots in the Hadoop clusters comprised of heterogeneous clusters, and dynamically replicates data based on the probability.

17 Claims, 3 Drawing Sheets

(56) References Cited

U.S. PATENT DOCUMENTS

2015/0074672 A1* 3/2015 Yeddanapudi .......... H04L 47/11
718/103

FOREIGN PATENT DOCUMENTS

KR          10-1533340 B1    7/2015
WO          2012/127988 A1   9/2012

OTHER PUBLICATIONS

Article entitled "CDRM: A Cost-effective Dynamic Replication Management Scheme for Cloud Storage Cluster", by Wei et al., dated 2010.*

Article entitled "Dynamic Processing Slots Scheduling for I/O Intensive Jobs of Hadoop MapReduce", by Kurazumi et al., Copyright 2012.*

Hyun Suk Jung, "SSD Aware Dynamic Replica Management for Improving Hadoop MapReduce Performance", Thesis for Graduate School of Convergence Science and Technology, Seoul National University (Aug. 2015).

\* cited by examiner

SYSTEM, METHOD, AND APPARATUS FOR DYNAMICALLY REPLICATING DATA FOR HETEROGENEOUS HADOOP

CROSS-REFERENCE TO RELATED APPLICATION

This application claims priority to Korean Patent Application No. 10-2015-0175832, filed on Dec. 10, 2015, the disclosure of which is incorporated herein by reference in its entirety.

BACKGROUND

The present disclosure relates to a system, a method, and an apparatus for replicating data in a Hadoop, and more particularly, to a system, a method, and an apparatus for dynamically replicating data for a heterogeneous Hadoop, which provide a dynamic data replication method for dynamically replicating data based on a probability that a map task will be allocated to a map task slot of an optimal data node by a data replication method for a Hadoop having heterogeneous clusters, and a dynamic data eviction method for evicting data based on a data access frequency.

In recent years, the biggest topic in the information technology (IT) industry is cloud computing.

The amount of data is increasing exponentially due to the spread of mobile devices and tablets. And accordingly, the use of the term "big data" has begun, and the importance of cloud computing is increasing day by day.

Cloud computing is a computing environment in which IT-related services such as the storage of data, the use of network content, and the like can be simultaneously used through a server on the Internet.

While cloud computing is getting spotlighted, interest in the Hadoop and MapReduce has also naturally been increased.

A Hadoop is a Java-based software framework and is also an open-source-based distributed computing platform, which supports a distributed application program running on a big computer cluster that can process a massive amount of data.

The Hadoop is an open source framework that is composed of MapReduce, which is a distributed processing programming model, and a Hadoop Distributed File System (HDFS), which is used throughout Hadoop.

MapReduce is a framework that distributes a massive amount of data to several nodes to process the data. An HDFS is a distributed computing platform that is used when Hadoop processes a massive amount of data.

Conventionally, a Hadoop delivers a task to a data node that stores data in order to minimize network congestion and increase throughput of the entire system. The most ideal performance may be obtained when a task is performed by a data node that stores a data block.

However, when all data nodes that store input data of tasks perform tasks, the tasks are performed after the data is copied, and a delay time is caused. Thus it causes to reduce the performance of MapReduce.

Conventionally, a Hadoop stores three copies of each piece of data stored in an HDFS in a corresponding data node, and does not have a data replication method for dynamically adjusting the number of copies according to a real-time data access request.

An access count for each piece of the data stored in the HDFS is different, and it is inefficient to keep the number of copies of data frequently requested to be accessed equal to the number of copies of data infrequently requested to be accessed.

This is because a Hadoop delivers a task to a data node at which input data is placed in order to minimize the usage of network bandwidth and maximize throughput of MapReduce jobs.

The most ideal performance may be obtained when a task is performed by a data node that stores input data. However, when data has an access request count greater than the number of its copies, there is an increasing probability that a task will be allocated to a data node that does not store data.

Accordingly, a task is performed after an input data block is additionally copied to a currently available data node. This may cause a delay time, thereby reducing performance of MapReduce jobs.

SUMMARY OF THE DISCLOSURE

The present disclosure is directed to providing a system, a method, and an apparatus for dynamically replicating data for a heterogeneous Hadoop, which provides a dynamic data replication method for dynamically replicating data based on a probability that a map task will be allocated to a map task slot of an optimal data node by a data replication method for a Hadoop composed of heterogeneous clusters, and a dynamic data eviction method for evicting data based on a data access frequency.

According to one aspect of the present disclosure, a system for dynamically replicating data for a heterogeneous Hadoop is provided. The system includes a name node including a replication manager, wherein the replication manager calculates a probability that a map task is allocated to a map task slot of a data node that stores an input data block of the map task out of a plurality of map task slots of data nodes by using a number of the map task slots in the Hadoop clusters comprising of heterogeneous clusters, and dynamically replicates data based on the probability.

The map manager includes a dynamic data replica creator classifying a first map task slot of Data-Local-Map-Task-Slot of the data node that stores the input data block of the map task and a second map task slot of Rack-Local-Map-Task-Slot of a data node that does not store the input data block of the map task, and calculating the probability that the map task is allocated to the map task slot of the data node that does not perform a task and stores the input data block of the map task out of the plurality of map task slots of the data nodes using Bayesian theory and the following equation:

$$P(DLMT) = P(\text{Data Local Slots} | \text{Empty Slots}) \quad \text{[Equation]}$$

where P(DLMT) denotes the probability to select Data local Slots, each of which is the map task slot of the data node that stores the input data of the map task in the data node, out of Empty Slots, which are the map task slots that do not perform the task.

The map manager includes a dynamic data replica creator classifying a first map task slot of Data-Local-Map-Task-Slot of a data node that stores the input data block of the map task and a second map task slot of Rack-Local-Map-Task-Slot of a data node that does not store the input data block of the map task, and calculating the probability that the map task is allocated to the map task slot of the data node that does not perform a task and stores the input data block of the map task out of the plurality of map task slots of the data nodes using Bayesian theory and the Equation 1 below:

$$P(DLMT) = \frac{P(\text{Empty Slots} | \text{Data Local Slots}) \times P(\text{Data Local Slots})}{P(\text{Empty Slots})}$$

[Equation 1]

$$= \frac{\frac{n(\text{Empty Slots})}{n(\text{Data Local Slots})} \times \frac{n(\text{Data Local Slots})}{n(\text{Total Slots})}}{\frac{n(\text{Total Empty Slots})}{n(\text{Total Slots})}}$$

where P(Empty Slots|Data Local Slots) denotes a probability to select Empty Slots, each of which is the map task slot that does not perform the task, out of Data Local Slots, which are map task slots of data nodes that store the input data of the map task in the plurality of data nodes, wherein:

P(Empty Slots|Data Local Slots) is obtained by the Equation 2 below:

$$P(\text{Empty Slots} | \text{Data Local Slots}) = \frac{n(\text{Empty Slots})}{n(\text{Data Local Slots})}$$

[Equation 2]

where n(Data Local Slots) denotes the number of map task slots of the data nodes that store the input data of the map task out of the plurality of the data nodes, and n(Empty Slots) denotes the number of task slots that do not perform tasks in the data node;

P(Data Local Slots) denotes a probability to select Data Local Slots out of a total number of map task slots of the data nodes, and P(Data Local Slots) is obtained by the Equation 3 below:

$$P(\text{Data Local Slots}) = \frac{n(\text{Data Local Slots})}{n(\text{Total Slots})};$$

[Equation 3]

P(Empty Slots) denotes a probability to select the map task slot that does not perform the task out of the plurality of task slots of the data nodes, and P(Empty Slots) is obtained by the Equation 4 below:

$$P(\text{Empty Slots}) = \frac{n(\text{Total Empty Slots})}{n(\text{Total Slots})};$$

[Equation 4]

Total Slots is the total number of map task slots of the data nodes, and n(Total Slots) is obtained by the Equation 5 below:

$n(\text{Total Slots}) = n(\text{Data Local Slots}) + n(\text{Rack Local Slots})$ [Equation 5]

where n(Data Local Slots) denotes the number of map task slots of the data nodes that store the input data of the map task out of the plurality of the data nodes, and n(Rack Local Slots) is the number of map task slots of data nodes that do not store the input data of the map task out of the plurality of the data nodes; and Empty Slots are slots that do not perform tasks in a data node, and n(Total Empty Slots) is obtained by the Equation 6 below:

$n(\text{Total Empty Slots}) = n(\text{Data Local Empty Slots}) + n(\text{Rack Local Empty Slots})$ [Equation 6]

where n(Data Local Empty Slots) denotes a number of empty slots that do not perform tasks among the map task slots of the data nodes that store the input data of the map task in the plurality of the data nodes, and n(Rack Local Empty Slots) denotes a number of empty slots that do not perform tasks among the map task slots of the data nodes that do not store the input data of the map task in the plurality of the data nodes.

The map manager includes a Data Local Job Probability (DLJP) calculator calculating a probability P(DLJ) that a map disk Data-Local-Map-Task (DLMT), which is allocated to the first map task slot of Data-Local-Map-Task-Slot out of the plurality of map tasks, occurs in a job having an i-number of map tasks, and wherein the probability P(DLJ) is calculated by using the Equation 7 below:

$$P(DLJ) = \frac{P(DLMT_{[1]} + DLMT_{[2]} + DLMT_{[3]} + \ldots + DLMT_{[4]})}{n(\text{Total Map Task})}$$

[Equation 7]

$$= \frac{\sum_{i=0}^{n} P(DLMT_{[1]})}{n(\text{Total Map Task})}$$

where n(Total Map Task) denotes a total number of the map tasks of the plurality of the data nodes.

The dynamic data replica creator replicates data in real time using the probability P(DLJ), and schedules and allocates the map task to the second map task slot of Rack-Local-Map-Task-Slot when all of the first map task slots of Data-Local-Map-Task-Slots of the map task are performing tasks.

The replication manager includes a replica eviction selector: measuring a frequency of access to Data[i] using the Equation 8 below; measuring a frequency of access to all data of a Hadoop Distributed File System (HDFS) using the Equation 9 below; and evicting a data replica when the frequency of access to the Data[i] is lower than the frequency of access to all data of the HDFS, wherein the Equation 8 is $$Data[i] \cdot \text{Access Frequency} = \frac{Data[i] \cdot \text{Access Count}}{Data[i] \cdot \text{Stored Time}}$$

where Data[i].AccessFrequency denotes the frequency of access to the Data[i], Data[i].StoredTime denotes a storage time of the Data[i], Data[i].AccessCount denotes a number of accesses to the Data[i], and i is a number of tasks; and Equation 9 is $$\text{Data Access Frequency of } HDFS = \frac{\text{Total Data Access Count}}{HDFS \text{ Running Time}}$$

where Data.AccessFrequency of HDFS is the frequency of access to all data of the HDFS, HDFS RunningTime is an operating time of the HDFS, and Total Data Access Count is a number of accesses to all data of the HDFS.

According to another aspect of the present disclosure, a method of dynamically replicating data for heterogeneous Hadoop is provided. The method includes calculating a probability that that a map task is allocated to a map task slot of a data node that stores an input data block of the map task out of a plurality of map task slots of data nodes by using a number of the map task slots in Hadoop clusters comprising heterogeneous clusters, and dynamically replicating data based on the probability.

The step of the calculating of the probability further includes classifying a first map task slot of Data-Local-Map-Task-Slot of the data node that stores the input data block of the map task and a second map task slot of Rack-Local-Map-Task-Slot of a data node that does not store the input data block of the map task, and calculating the probability that the map task is allocated to the map task slot of the data node that does not perform a task and stores the input data block of the map task out of the plurality of map task slots of the data nodes using Bayesian theory and the Equation 1:

$$P(DLMT) = P(\text{Data Local Slots} | \text{Empty Slots}) \quad [\text{Equation 1}]$$

where P(DLMT) denotes the probability to select Data Local Slots, each of which is the map task slot of the data node that stores the input data of the map task in the data node, out of Empty Slots, which are the map task slots that do not perform the task.

The step of the calculating of the probability using Bayesian theory further includes: calculating a probability P(DLJ) that a map disk Data-Local-Map-Task (DLMT), which is allocated to the first map task slot of Data-Local-Map-Task-Slot out of the plurality of map tasks, occurs in a job having an i-number of map tasks, and wherein the probability P(DLJ) is calculated by using the Equation 2 below:

$$P(DLJ) = \frac{P(DLMT_{[1]} + DLMT_{[2]} + DLMT_{[3]} + \ldots + DLMT_{[4]})}{n(\text{Total Map Task})}$$

$$= \frac{\sum_{i=0}^{n} P(DLMT_{[1]})}{n(\text{Total Map Task})}$$

[Equation 2]

where n(Total Map Task) denotes a total number of the map tasks of the plurality of the data nodes.

According to another aspect of the present disclosure, an apparatus for dynamically replicating data for a heterogeneous Hadoop is provided. The apparatus includes a name node including a replication manager. The replication manager calculates a probability that a map task is allocated to a map task slot of a data node that stores an input data block of the map task out of a plurality of map task slots of data nodes by using a number of the map task slots in the Hadoop clusters comprising heterogeneous clusters, and dynamically replicates data based on the probability.

The map manager includes a dynamic data replica creator classifying a first map task slot of Data-Local-Map-Task-Slot of the data node that stores the input data block of the map task and a second map task slot of Rack-Local-Map-Task-Slot of a data node that does not store the input data block of the map task, and calculating the probability that the map task is allocated to the map task slot of the data node that does not perform a task and stores the input data block of the map task out of the plurality of map task slots of the data nodes using Bayesian theory and the following equation:

$$P(DLMT) = P(\text{Data Local Slots} | \text{Empty Slots}) \quad [\text{Equation}]$$

where P(DLMT) denotes the probability to select Data Local Slots, each of which is the map task slot of the data node that stores the input data of the map task in the data node, out of Empty Slots, which are the map task slots that do not perform the task.

The map manager includes a dynamic data replica creator classifying a first map task slot of Data-Local-Map-Task-Slot of a data node that stores the input data block of the map task and a second map task slot of Rack-Local-Map-Task-Slot of a data node that does not store the input data block of the map task, and calculating the probability that the map task is allocated to the map task slot of the data node that does not perform a task and stores the input data block of the map task out of the plurality of map task slots of the data nodes using Bayesian theory and the Equation 1 below:

[Equation 1]
$$P(DLMT) = \frac{P(\text{Empty Slots} | \text{Data Local Slots}) \times P(\text{Data Local Slots})}{P(\text{Empty Slots})}$$

$$= \frac{\frac{n(\text{Empty Slots})}{n(\text{Data Local Slots})} \times \frac{n(\text{Data Local Slots})}{n(\text{Total Slots})}}{\frac{n(\text{Total Empty Slots})}{n(\text{Total Slots})}}$$

where P(Empty Slots|Data Local Slots) denotes a probability to select each of which is the map task slot that does not perform the task, out of Data Local Slots, which are map task slots of data nodes that store the input data of the map task in the plurality of data nodes, wherein:

P(Empty Slots|Data Local Slots) is obtained by the Equation 2 below:

$$P(\text{Empty Slots} | \text{Data Local Slots}) = \frac{n(\text{Empty Slots})}{n(\text{Data Local Slots})} \quad [\text{Equation 2}]$$

where n(Data Local Slots) denotes the number of map task slots of the data nodes that store the input data of the map task out of the plurality of the data nodes, and n(Empty Slots) denotes the number of task slots that do not perform tasks in the data node;

P(Data Local Slots) denotes a probability to select Data Local Slots out of a total number of map task slots of the data nodes, and P(Data Local Slots) is obtained by the Equation 3 below:

$$P(\text{Data Local Slots}) = \frac{n(\text{Data Local Slots})}{n(\text{Total Slots})}; \quad [\text{Equation 3}]$$

P(Empty Slots) denotes a probability to select the map task slot that does not perform the task out of the plurality of task slots of the data nodes, and P(Empty Slots) is obtained by the $$P(\text{Empty Slots}) = \frac{n(\text{Total Empty Slots})}{n(\text{Total Slots})}; \quad [\text{Equation 4}]$$

Total Slots is the total number of map task slots of the data nodes, and n(Total Slots) is obtained by the Equation 5 below:

$$n(\text{Total Slots}) = n(\text{Data Local Slots}) + n(\text{Rack Local Slots}) \quad [\text{Equation 5}]$$

where n(Data Local Slots) denotes the number of map task slots of the data nodes that store the input data of the map task out of the plurality of the data nodes, and n(Rack Local Slots) is the number of map task slots of data nodes that do not store the input data of the map task out of the plurality of the data nodes; and Empty Slots are slots that do not perform tasks in a data node, and n(Total Empty Slots) is obtained by the Equation 6 below:

$$n(\text{Total Empty Slots}) = n(\text{Data Local Empty Slots}) + n(\text{Rack Local Empty Slots}) \quad \text{[Equation 6]}$$

where n(Data Local Empty Slots) denotes a number of empty slots that do not perform tasks among the map task slots of the data nodes that store the input data of the map task in the plurality of the data nodes, and n(Rack Local Empty Slots) denotes a number of empty slots that do not perform tasks among the map task slots of the data nodes that do not store the input data of the map task in the plurality of the data nodes.

The map manager comprises a Data Local Job Probability (DLJP) calculator calculating a probability P(DLJ) that a map disk Data-Local-Map-Task (DLMT), which is allocated to the first map task slot of Data-Local-Map-Task-Slot out of the plurality of map tasks, occurs in a job having an i-number of map tasks, and wherein the probability P(DLJ) is calculated by using the Equation 7 below:

[Equation 7]
$$P(DLJ) = \frac{P(DLMT_{[1]} + DLMT_{[2]} + DLMT_{[3]} + \ldots + DLMT_{[i]})}{n(\text{Total Map Task})}$$
$$= \frac{\sum_{i=0}^{n} P(DLMT_{[i]})}{n(\text{Total Map Task})}$$

where n(Total Map Task) denotes a total number of the map tasks of the plurality of the data nodes.

The dynamic data replica creator replicates data in real time using the probability P(DLJ), and schedules and allocates the map task to the second map task slot of Rack-Local-Map-Task-Slot when all of the first map task slots of Data-Local-Map-Task-Slots of the map task are performing tasks.

The replication manager comprises a replica eviction selector: measuring a frequency of access to Data[i] using the Equation 8 below; measuring a frequency of access to all data of a Hadoop Distributed File System (HDFS) using the Equation 9 below; and evicting a data replica when the frequency of access to the Data[i] is lower than the frequency of access to all data of the HDFS, wherein the Equation (8) is $$\text{Data}[i].\text{Access Frequency} = \frac{\text{Data}[i].\text{Access Count}}{\text{Data}[i].\text{Stored Time}}$$

where Data[i].AccessFrequency denotes the frequency of access to the Data[i], Data[i].StoredTime denotes a storage time of the Data[i], Data[i].AccessCount denotes a number of accesses to the Data[i], and i is a number of tasks; and Equation 9 is $$\text{Data Access Frequency of } HDFS = \frac{\text{Total Data Access Count}}{HDFS \text{ Running Time}}$$

where Data.AccessFrequency of HDFS is the frequency of access to all data of the HDFS, HDFS RunningTime is an operating time of the HDFS, and Total Data Access Count is a number of accesses to all data of the HDFS.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, when one part is referred to as "comprising" (or "including" or "having") other elements, it should be understood that the one part can comprise (or include or have) only those elements, or other elements as well as those elements unless specifically described otherwise.

A conventional Hadoop cluster structure has a single name node and multiple data nodes. The name node includes a job tracker, a name node, and a secondary name node.

The name node manages a namespace in a file system, and the namespace has a directory, a file name, a file block, location information of data, and the like.

The data node is configured with block units that actually store files.

MapReduce is a framework for distributing a large amount of data to several nodes to process the data. A MapReduce job is a unit of work that a user wants to be performed.

The map task receives a data block stored in a Hadoop Distributed File System (HDFS).

Since the result data obtained by performing the map task is an intermediate result that is used only as input data of a Reduce task, the result data is stored in a local disk of the data node that performs the task rather than in the HDFS.

Also, a map disk may obtain a most high performance thereof when the task is performed by the data node that stores the input data.

Figure 1:
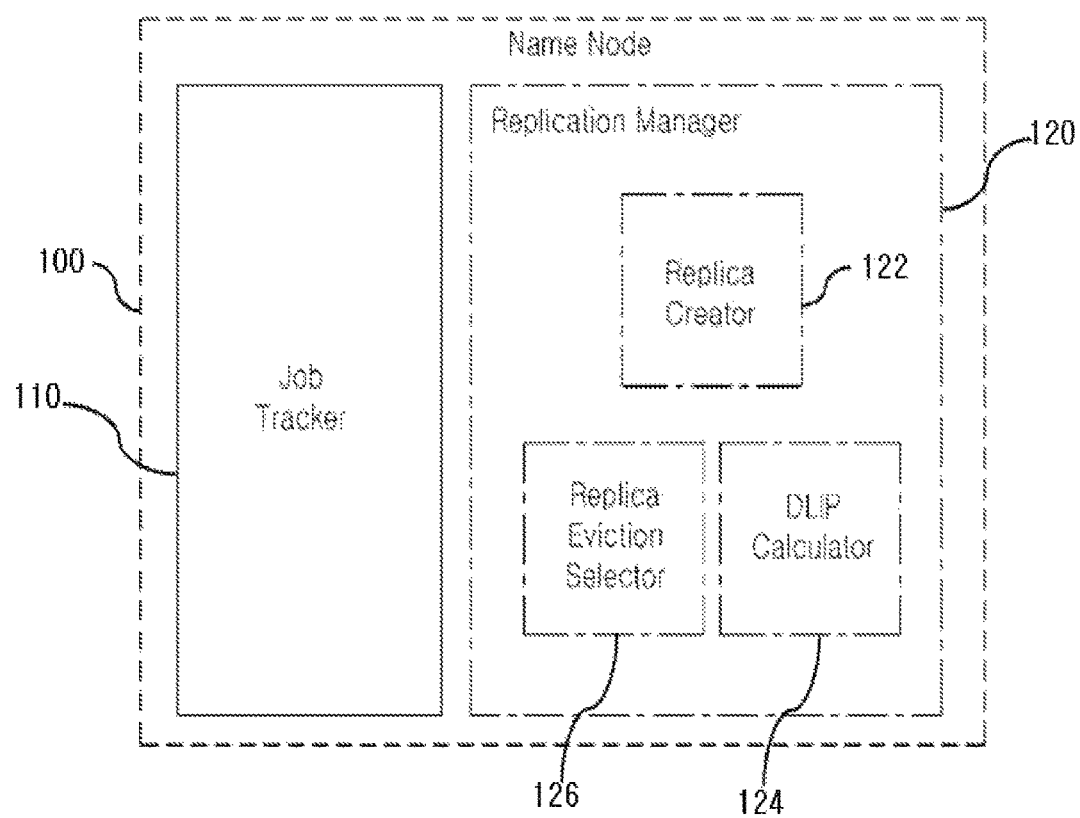
FIG. 1 is a diagram showing a configuration of a system for dynamically replicating data for heterogeneous Hadoop according to one embodiment of the present disclosure.
Figure 2:
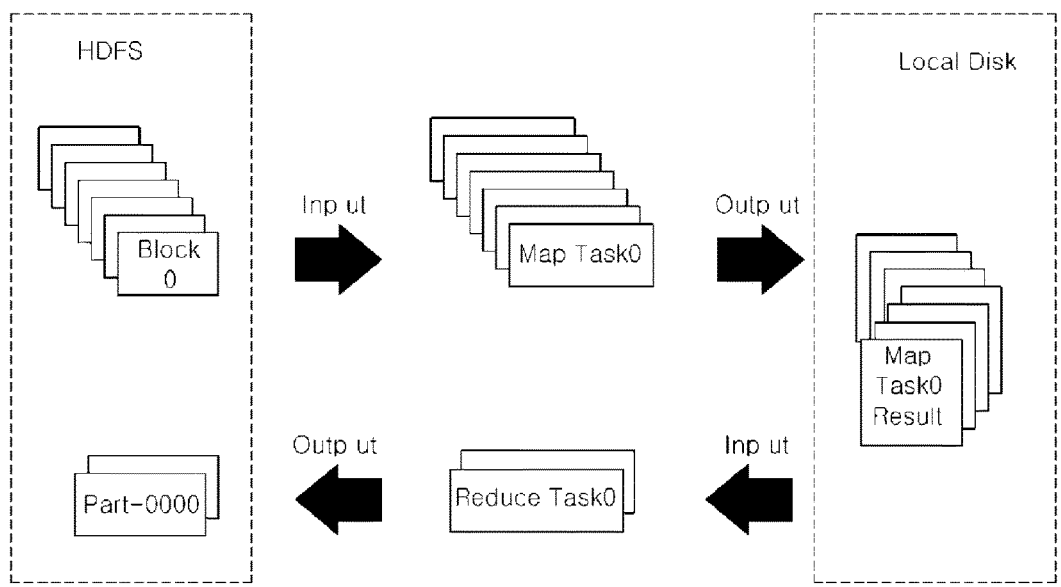
FIG. 2 is a diagram showing a data flow of a MapReduce job according to the embodiment of the present disclosure.
Figure 3:
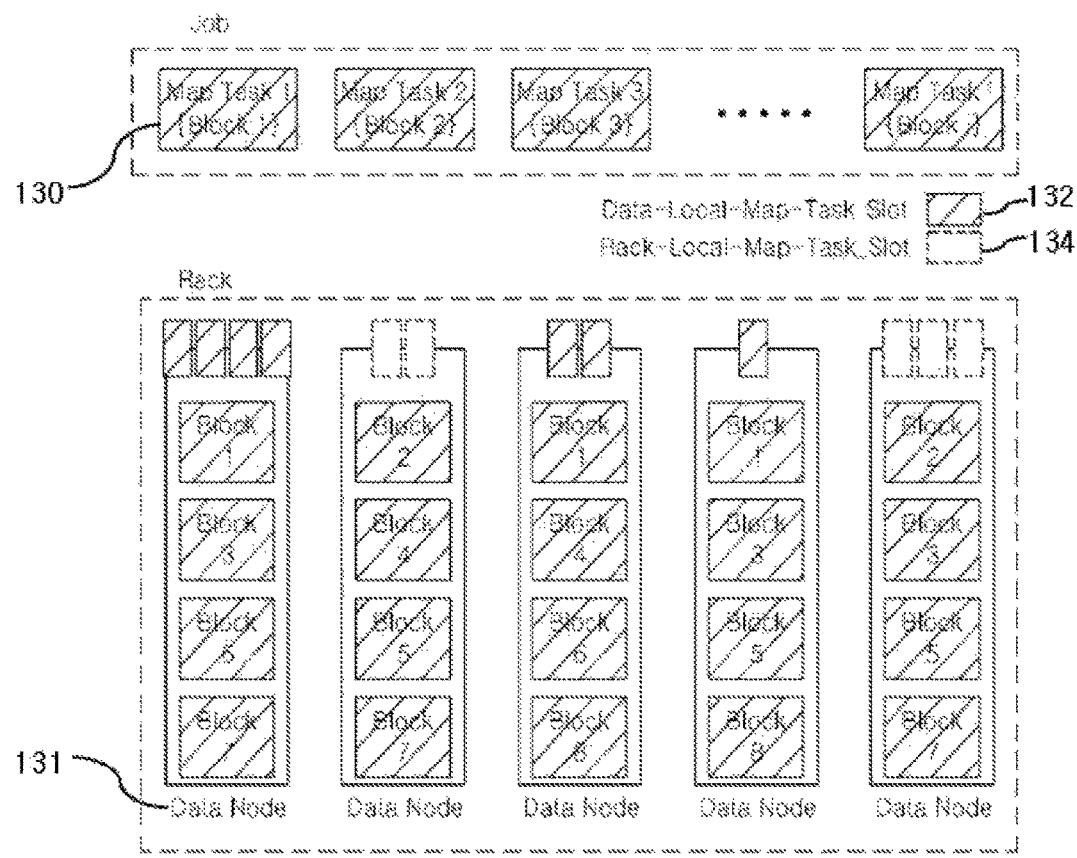
FIG. 3 is a diagram showing an aspect of classifying Data-Local-Map-Task-Slots and Rack-Local-Map-Task-Slots on the basis of Map Task1 receiving Block1 as input data according to the embodiment of the present disclosure.

FIG. 1 is a diagram showing a configuration of a system for dynamically replicating data for heterogeneous Hadoop according to one embodiment of the present disclosure, FIG. 2 is a diagram showing a data flow of a MapReduce job according to the embodiment of the present disclosure, and FIG. 3 is a diagram showing an aspect of classifying Data-Local-Map-Task-Slots and Rack-Local-Map-Task-Slots on the basis of Map Task1 receiving Block1 as input data according to the embodiment of the present disclosure.

In a Hadoop having heterogeneous clusters, there are differences in performance among data nodes. Thus, the number of map tasks that may be simultaneously executed by each node is different.

Accordingly, the present disclosure sets a map task slot of each data node on the basis of performance thereof, unlike a conventional data replication method that does not consider performance.

The number of map slots refers to the number of map tasks that can be simultaneously executed by the data node.

A reduce task receives a result data of a map task as input data, and the result data of the map task is not stored in the HDFS but in a local file system. Thus, it is difficult to expect a performance enhancement due to data replication.

Unlike this, input data of the map task is data blocks stored in the HDFS and affects the performance of the map task depending on the number of data replicas.

Accordingly, the present disclosure uses map slots other than a Reduce slot as a criterion for the performance of heterogeneous clusters.

A data flow of MapReduce jobs is shown in FIG. 2.

A system for dynamically replicating data for heterogeneous Hadoop according to one embodiment of the present disclosure includes a name node 100 including a job tracker 110 and a replication manager 120.

The replication manager 120 includes a dynamic data replica creator 122, a data local job probability (DLJP) calculator 124, and a replica eviction selector 126.

The dynamic data replica creator 122 classifies Data-Local-Map-Task-Slots 132, each of which is a map task slot of a data node 131 that stores an input data block of a map task 130, and Rack-Local-Map-Task-Slots 134, each of which is a map task slot of the data node 131 that does not store the input data block of the map task 130.

A method of classifying the Data-Local-Map-Task-Slots 132 and the Rack-Local-Map-Task-Slots 134 is shown in FIG. 3.

The map task 130 allocated to the Data-Local-Map-Task-Slots 132 can be hereinafter referred to as DLMT, and the map task 130 allocated to the Rack-Local-Map-Task-Slots 134 can be hereinafter referred to as RLMT.

As shown in FIG. 3, the dynamic data replica creator 122 classifies the Data-Local-Map-Task-Slots 132 and the Rack-Local-Map-Task-Slots 134 on the basis of Map Task1 receiving Block1 130 as input data. According to the same principle, the dynamic data replica creator 122 classifies the Data-Local-Map-Task-Slots 132 and the Rack-Local-Map-Task-Slots 134 with respect to other blocks.

The dynamic data replica creator 122 measures a probability P(DLMT) that the map task 130 will be allocated to Data-Local-Map-Task-Slots that do not work among a total number of map task slots of data nodes using Equation (1) below, to which Bayesian theory is applied.

The Bayesian theory is a method of measuring prior probabilities of events that may be causes of a specific event after the specific event occurs and deducing posterior probabilities of events that may become causes later using the measured prior probabilities.

$$P(DLMT) = P(\text{Data Local Slots} | \text{Empty Slots})$$
$$= \frac{P(\text{Empty Slots} | \text{Data Local Slots}) \times P(\text{Data Local Slots})}{P(\text{Empty Slots})}$$
$$= \frac{\frac{n(\text{Empty Slots})}{n(\text{Data Local Slots})} \times \frac{n(\text{Data Local Slots})}{n(\text{Total Slots})}}{\frac{n(\text{Total Empty Slots})}{n(\text{Total Slots})}}.$$

[Equation (1)]

Total Slots denotes the total number of map task slots of data nodes.

N(Total Slots) is found using Equation (2) below:

$$n(\text{Total Slots}) = n(\text{Data Local Slots}) + n(\text{Rack Local Slots})$$ [Equation (2)]

where n(Data Local Slots) denotes the number of map task slots of data nodes that store input data of a map task out of all of the plurality of data nodes, and n(Rack Local Slots) denotes the number of map task slots of data nodes that do not store the input data of the map task out of all of the plurality of data nodes.

Empty Slots denotes slots that do not perform tasks in data nodes.

n(Total Empty Slots) is obtained by using Equation (3) below:

$$n(\text{Total Empty Slots}) = n(\text{Data Local Empty Slots}) + n(\text{Rack Local Empty Slots})$$ [Equation (3)]

where n(Data Local Empty Slots) denotes the number of empty slots that do not perform tasks among the map task slots of the data nodes that store the input data of the map task among in all of the plurality of the data nodes, and n(Rack Local Empty Slots) denotes the number of empty slots that do not perform tasks among the map task slots of the data nodes that do not store the input data of the map task in all of the plurality of the data nodes.

P(Empty Slots|Data Local Slots) denotes a probability to select Empty Slots, each of which is a map task slot that does not perform the task, out of Data Local Slots.

P(Empty Slots|Data Local Slots) is obtained by using Equation (4) below:

$$P(\text{Empty Slots} | \text{Data Local Slots}) = \frac{n(\text{Empty Slots})}{n(\text{Data Local Slots})}.$$ [Equation (4)]

P(Data Local Slots) denotes a probability to select Data Local Slots out of a total number of map task slots of the data nodes.

P(Data Local Slots) is obtained by using Equation (5) below:

$$P(\text{Data Local Slots}) = \frac{n(\text{Data Local Slots})}{n(\text{Total Slots})}.$$ [Equation (5)]

P(Empty Slots) denotes a probability to select a map task slot that does not perform task out of all of the plurality of slots of the data nodes.

P(Empty Slots) is obtained by using Equation (6) below:

$$P(\text{Empty Slots}) = \frac{n(\text{Total Empty Slots})}{n(\text{Total Slots})}.$$ [Equation (6)]

The DLJP calculator 124 calculates a probability P(DLJ) that, in a job composed of an i-number of map tasks, DLMT will occur among all of the plurality of map tasks, using Equation (7).

P(DLJ) is obtained by using Equation (7). Here, i is the number of tasks.

$$P(DLJ) = \frac{P(DLMT_{[1]} + DLMT_{[2]} + DLMT_{[3]} + \ldots + DLMT_{[i]})}{n(\text{Total Map Task})}$$

$$= \frac{\sum_{i=0}^{n} P(DLMT_{[i]})}{n(\text{Total Map Task})}.$$

[Equation 7]

An algorithm for measuring P(DLJ) is shown as follows:

```
Calculate Data-Local-Job-Probability
Initialize TotalDataNodeSlots to 0
for DataNode[i] in DataNode[0]...DataNode[n−1]
    set TotalDataNodeSlots =
            TotalDataNodeSlots + DataNode[i].Slots
end for
when Data[x].Block[i] is the input block for Task[i]
Initialize DataLocalSlots to 0 for all Blocks in Data[x]
for Block[i] in Block[0]...Block[n−1]
    for DataNode[j] in DataNode[0]...DataNode[n−1]
        if DataNode[j] has DataLocalNode of Data[x].Block[i]
then
            set Data[x].Block[i].DataLocalSlots
                            += DataNode[j] empty slots
        end if
    end for
    set Data[x].Block[i].DataLocalMapTaskProbability =
            Data[x].Block[i].DataLocalSlots / TotalDataNodeSlots
end for
when Data[x] is the input data for this job
Initailize Data[x].LocalJobProbability to 0
for Block[i] in Block[0]...Block[n−1]
    set Data[x].DataLocalJobProbability
                    += Data[x].Block[i].DataLocalProbability
end for
set Data[x].DataLocalJobProbability =
            Data[x].DataLocalJobProbability / TotalDataBlocks
```

The dynamic data replica creator 122 replicates data in real time using which is calculated by the DLJP calculator 124.

When all Data-Local-Map-Task-Slots of the map task 130 are performing tasks, the dynamic data replica creator 122 schedules and allocates the map task to Rack-Local-Map-Task-Slots.

The dynamic data replica creator 122 creates any value r when the scheduling is performed. When the value r is greater than P(DLJ), the dynamic data replica creator 122 replicates data and updates DataLocalJobProbability and AccessCount.

When the value r is less than P(DLJ), the dynamic data replica creator 122 temporarily replicates a data block and updates AccessCount. An algorithm for dynamically replicating data is shown as follows:

```
Dynamic Replication logic based on
                        Data-Local-Job-Probability
when a heartbeat is received from datanode
    if a rack-local-map-task is scheduled then
        Generate random number r (0<r<1)
        when Data[x] is the input data for job
            get DataLocalJobProbability of job
            if r > DataLocalJobProbability then
                replicate Data[x]
                increase Data[x].ReplicationFactor
                increase Data[x].AccessCount
                update Data[x].DataLocalJobProbability
            else
                create Cache
                increase Data[x].AccessCount
            end if
    end if
```

A Least Recently Frequently Access (LRFA) data eviction method is proposed in order to evict old data that has a low access frequency among data stored in an HDFS to enhance efficiency of storage space of the HDFS.

The replica eviction selector 126 measures a frequency of access to Data[i] and a frequency of access to all data of the HDFS using the LRFA data eviction method.

When the frequency of access to the Data[i] is lower than the frequency of access to all data of the HDFS, the replica eviction selector 126 evicts a data replica.

The frequency of access to the Data[i] is measured using Equation (8) below:

$$\text{Data}[i].\text{Access Frequency} = \frac{\text{Data}[i].\text{Access Count}}{\text{Data}[i].\text{Stored Time}} \quad [\text{Equation (8)}]$$

where Data[i].AccessFrequency denotes the frequency of access to the Data[i], Data[i].StoredTime denotes a storage time of the Data[i], and Data[i].AccessCount denotes the number of accesses to the Data[i].

The frequency of access to all data of HDFS is measured using Equation (9) below:

$$\text{Data Access Frequency of } HDFS = \frac{\text{Total Data Access Count}}{HDFS \text{ Running Time}}$$

where Data.AccessFrequency of HDFS denotes the frequency of access to all of the data of the HDFS, HDFS RunningTime denotes an operating time of the HDFS, and Total Data Access Count denotes the number of accesses to all of the data. An algorithm for the LRFA data eviction is shown as follows:

```
Dynamic Replication logic based on
                        Data-Local-Job-Probability
when a heartbeat is received from datanode
    if a rack-local-map-task is scheduled then
        Generate random number r (0<r<1)
        when Data[x] is the input data for job
            get DataLocalJobProbability of job
            if r > DataLocalJobProbability then
                replicate Data[x]
                increase Data[x].ReplicationFactor
                increase Data[x].AccessCount
                update Data[x].DataLocalJobProbability
            else
                create Cache
                increase Data[x].AccessCount
            end if
    end if
```

According to the above-described configuration, the present disclosure can improve performance when data is replicated by setting a map task slot of a data node as a criterion for performance of each node in heterogeneous Hadoop.

The present disclosure can improve performance of MapReduce by applying dynamic data replication in heterogeneous Hadoop.

The above-described embodiment of the present disclosure is not implemented only by an apparatus and/or method, but can be implemented through a program for realizing functions corresponding to a configuration of the embodiment of the present disclosure and a recording medium having the program recorded thereon. Such implementation can be easily made by those skilled in the art to which the present disclosure pertains from the above description of the embodiment.

Although the embodiment of the present disclosure has been described in detail, the scope of the present disclosure is not limited thereto, but modifications and alterations made by those skilled in the art using the basic concept of the present disclosure defined in the following claims fall within the scope of the present disclosure.

What is claimed is:

1. A system for dynamically replicating data for heterogeneous Hadoop, the system comprising a name node including a replication manager, wherein the replication manager calculates a probability that a map task is allocated to a map task slot of a data node that stores an input data block of the map task out of a plurality of map task slots of data nodes by using a number of the map task slots in Hadoop clusters comprising heterogeneous clusters, and dynamically replicates data based on the probability, wherein the replication manager comprises a dynamic data replica creator configured to classify a first map task slot of Data-Local-Map-Task-Slot of the data node that stores the input data block of the map task and a second map task slot of Rack-Local-Map-Task-Slot of a data node that does not store the input data block of the map task, and to calculate the probability that the map task is allocated to the map task slot of the data node that does not perform a task and stores the input data block of the map task out of the plurality of map task slots of the data nodes.

2. The system of claim 1, wherein the calculating the probability is performed using Bayesian theory and the following equation:

$$P(DLMT) = P(\text{Data Local Slots} | \text{Empty Slots}) \quad [\text{Equation}]$$

where P(DLMT) denotes the probability to select Data Local Slots, each of which is the map task slot of the data node that stores the input data of the map task in the data node, out of Empty Slots, which are the map task slots that do not perform the task.

3. The system of claim 1, wherein the calculating the probability is performed using Bayesian theory and the Equation 1 below:

$$P(DLMT) = \frac{P(\text{Empty Slots} | \text{Data Local Slots}) \times P(\text{Data Local Slots})}{P(\text{Empty Slots})} \quad [\text{Equation 1}]$$

$$= \frac{\frac{n(\text{Empty Slots})}{n(\text{Data Local Slots})} \times \frac{n(\text{Data Local Slots})}{n(\text{Total Slots})}}{\frac{n(\text{Total Empty Slots})}{n(\text{Total Slots})}}$$

where P(Empty Slots|Data Local Slots) denotes a probability to select Empty Slots, each of which is the map task slot that does not perform the task, out of Data Local Slots, which are map task slots of data nodes that store the input data of the map task in the plurality of data nodes, wherein:

P(Empty Slots|Data Local Slots) is obtained by the Equation 2 below:

$$P(\text{Empty Slots} | \text{Data Local Slots}) = \frac{n(\text{Empty Slots})}{n(\text{Data Local Slots})} \quad [\text{Equation 2}]$$

where n(Data Local Slots) denotes the number of map task slots of the data nodes that store the input data of the map task out of the plurality of data nodes, and n(Empty Slots) denotes the number of task slots that do not perform tasks in the data node;

P(Data Local Slots) denotes a probability to select Data Local Slots out of a total number of map task slots of the data nodes, and P(Data Local Slots) is obtained by the Equation 3 below:

$$P(\text{Data Local Slots}) = \frac{n(\text{Data Local Slots})}{n(\text{Total Slots})}; \quad [\text{Equation 3}]$$

P(Empty Slots) denotes a probability to select the map task slot that does not perform the task out of the plurality of task slots of the data nodes, and P(Empty Slots) is obtained by the Equation 4 below:

$$P(\text{Empty Slots}) = \frac{n(\text{Total Empty Slots})}{n(\text{Total Slots})}; \quad [\text{Equation 4}]$$

Total Slots the total number of map task slots of the data nodes, and n(Total Slots) is obtained by the Equation 5 below:

$$n(\text{Total Slots}) = n(\text{Data Local Slots}) + n(\text{Rack Local Slots}) \quad [\text{Equation 5}]$$

where n(Data Local Slots) denotes the number of map task slots of the data nodes that store the input data of the map task out of the plurality of the data nodes, and n(Rack Local Slots) is the number of map task slots of data nodes that do not store the input data of the map task out of the plurality of the data nodes; and Empty Slots are slots that do not perform tasks in a data node, and n(Total Local Slots) is obtained by the Equation 6 below:

$$n(\text{Total Empty Slots}) = n(\text{Data Local Empty Slots}) + n(\text{Rack Local Empty Slots}) \quad [\text{Equation 6}]$$

where n(Data Local Empty Slots) denotes a number of empty slots that do not perform tasks among the map task slots of the data nodes that store the input data of the map task in the plurality of the data nodes, and n(Rack Local Empty Slots) denotes a number of empty slots that do not perform tasks among the map task slots of the data nodes that do not store the input data of the map task in the plurality of the data nodes.

4. The system of claim 2, wherein the replication manager comprises a Data Local Job Probability (DLJP) calculator calculating a probability P(DLJ) that a map disk Data-Local-Map-Task (DLMT), which is allocated to the first map task slot of Data-Local-Map-Task-Slot out of the plurality of map tasks, occurs in a job having an i-number of map tasks, and wherein the probability P(DLJ) is calculated by using the Equation 7 below:

$$P(DLJ) = \frac{P(DLMT_{[1]} + DLMT_{[2]} + DLMT_{[3]} + \ldots + DLMT_{[i]})}{n(\text{Total Map Task})}$$
$$= \frac{\sum_{i=0}^{n} P(DLMT_{[i]})}{n(\text{Total Map Task})}$$
[Equation 7]

where n(Total Map Task) denotes a total number of the map tasks of the plurality of the data nodes.

5. The system of claim 3, wherein the replication manager comprises a Data Local Job Probability (DLJP) calculator calculating a probability P(DLJ) that a map disk Data-Local-Map-Task (DLMT), which is allocated to the first map task slot of Data-Local-Map-Task-Slot out of the plurality of map tasks, occurs in a job having an i-number of map tasks, and wherein the probability P(DLJ) is calculated by using the Equation 7 below:

$$P(DLJ) = \frac{P(DLMT_{[1]} + DLMT_{[2]} + DLMT_{[3]} + \ldots + DLMT_{[i]})}{n(\text{Total Map Task})}$$
$$= \frac{\sum_{i=0}^{n} P(DLMT_{[i]})}{n(\text{Total Map Task})}$$
[Equation 7]

where n(Total Map Task) denotes a total number of the map tasks of the plurality of the data nodes.

6. The system of claim 4, wherein the dynamic data replica creator replicates data in real time using the probability P(DLJ), and schedules and allocates the map task to the second map task slot of Rack-Local-Map-Task-Slot when all of the first map task slots of Data-Local-Map-Task-Slots of the map task are performing tasks.

7. The system of claim 1, wherein the replication manager comprises a replica eviction selector:

measuring a frequency of access to Data[i] using the Equation 8 below; measuring a frequency of access to all data of a Hadoop Distributed File System (HDFS) using the Equation 9 below; and evicting a data replica when the frequency of access to the Data[i] is lower than the frequency of access to all data of the HDFS, wherein the Equation (8) is $$\text{Data}[i].\text{Access Frequency} = \frac{\text{Data}[i].\text{Access Count}}{\text{Data}[i].\text{Stored Time}}$$

where Data[i].AccessFrequency denotes the frequency of access to the Data[i], Data[i].StoredTime denotes a storage time of the Data[i], Data[i].AccessCount denotes a number of accesses to the Data[i], and i is a number of tasks; and Equation 9 is $$\text{Data Access Frequency of } HDFS = \frac{\text{Total Data Access Count}}{\text{HDFS Running Time}}$$

where Data.AccessFrequency of HDFS is the frequency of access to all data of the HDFS, HDFS RunningTime is an operating time of the HDFS, and Total Data Access Count is a number of accesses to all data of the HDFS.

8. A method of dynamically replicating data for heterogeneous Hadoop, the method comprising:

calculating a probability that that a map task is allocated to a map task slot of a data node that stores an input data block of the map task out of a plurality of map task slots of data nodes by using a number of the map task slots in Hadoop clusters comprising heterogeneous clusters; and dynamically replicating data based on the probability, wherein the step of the calculating the probability further comprises:

classifying a first map task slot of Data-Local-Map-Task-Slot of the data node that stores the input data block of the map task and a second map task slot of Rack-Local-Map-Task-Slot of a data node that does not store the input data block of the map task; and calculating the probability that the map task is allocated to the map task slot of the data node that does not perform a task and stores the input data block of the map task out of the plurality of map task slots of the data nodes.

9. The method of claim 8, wherein the step of the calculating the probability is performed using Bayesian theory and the Equation 1:

P(DLMT)=P(Data Local Slots|Empty Slots)    [Equation 1]

where P(DLMT) denotes the probability to select Data Local Slots, each of which is the map task slot of the data node that stores the input data of the map task in the data node, out of Empty Slots, which are the map task slots that do not perform the task.

10. The method of claim 9, wherein the step of the calculating the probability using Bayesian theory comprises: calculating a probability P(DLJ) that a map disk Data-Local-Map-Task (DLMT), which is allocated to the first map task slot of Data-Local-Map-Task-Slot out of the plurality of map tasks, occurs in a job having an i-number of map tasks, and wherein the probability P(DLJ) is calculated by using the Equation 2 below:

$$P(DLJ) = \frac{P(DLMT_{[1]} + DLMT_{[2]} + DLMT_{[3]} + \ldots + DLMT_{[i]})}{n(\text{Total Map Task})}$$
$$= \frac{\sum_{i=0}^{n} P(DLMT_{[i]})}{n(\text{Total Map Task})}$$
[Equation 2]

where n(Total Map Task) denotes a total number of the map tasks of the plurality of the data nodes.

11. An apparatus for dynamically replicating data for heterogeneous Hadoop, the apparatus comprising a name node including a replication manager, wherein the replication manager calculates a probability that a map task is allocated to a map task slot of a data node that stores an input data block of the map task out of a plurality of map task slots of data nodes by using a number of the map task slots in Hadoop clusters comprising heterogeneous clusters, and dynamically replicates data based on the probability,
  wherein the replication manager comprises a dynamic data replica creator classifying a first map task slot of Data-Local-Map-Task-Slot of the data node that stores the input data block of the map task and a second map task slot of Rack-Local-Map-Task-Slot of a data node that does not store the input data block of the map task, and calculating the probability that the map task is allocated to the map task slot of the data node that does not perform a task and stores the input data block of the map task out of the plurality of map task slots of the data nodes.

12. The apparatus of claim 11, wherein the calculating the probability is performed using Bayesian theory and the following equation:

$$P(DLMT) = P(\text{Data Local Slots} | \text{Empty Slots}) \quad [\text{Equation}]$$

where P(DLMT) denotes the probability to select Data Local Slots, each of which is the map task slot of the data node that stores the input data of the map task in the data node, out of Empty Slots, which are the map task slots that do not perform the task.

13. The apparatus of claim 11, wherein the calculating the probability is performed using Bayesian theory and the Equation 1 below:

$$P(DLMT) = \frac{P(\text{Empty Slots} | \text{Data Local Slots}) \times P(\text{Data Local Slots})}{P(\text{Empty Slots})} = \frac{\frac{n(\text{Empty Slots})}{n(\text{Data Local Slots})} \times \frac{n(\text{Data Local Slots})}{n(\text{Total Slots})}}{\frac{n(\text{Total Empty Slots})}{n(\text{Total Slots})}} \quad [\text{Equation 1}]$$

where P(Empty Slots|Data Local Slots) denotes a probability to select Empty Slots, each of which is the map task slot that does not perform the task, out of Data Local Slots, which are map task slots of data nodes that store the input data of the map task in the plurality of data nodes, wherein:
P(Empty Slots|Data Local Slots) is obtained by the Equation 2 below:

$$P(\text{Empty Slots} | \text{Data Local Slots}) = \frac{n(\text{Empty Slots})}{n(\text{Data Local Slots})} \quad [\text{Equation 2}]$$

where n(Data Local Slots) denotes the number of map task slots of the data nodes that store the input data of the map task out of the plurality of the data nodes, and n(Empty Slots) denotes the number of task slots that do not perform tasks in the data node;
P(Data Local Slots) denotes a probability to select Data Local Slots out of a total number of map task slots of the data nodes, and P(Data Local Slots) is obtained by the Equation 3 below:

$$P(\text{Data Local Slots}) = \frac{n(\text{Data Local Slots})}{n(\text{Total Slots})} \quad [\text{Equation 3}]$$

P(Empty Slots) denotes a probability to select the map task slot that does not perform the task out of the plurality of task slots of the data nodes, and P(Empty Slots) is obtained by the Equation 4 below:

$$P(\text{Empty Slots}) = \frac{n(\text{Total Empty Slots})}{n(\text{Total Slots})}; \quad [\text{Equation 4}]$$

Total Slots is the total number of map task slots of the data nodes, and n(Total Slots) is obtained by the Equation 5 below:

$$n(\text{Total Slots}) = n(\text{Data Local Slots}) + n(\text{Rack Local Slots}) \quad [\text{Equation 5}]$$

where n(Data Local Slots) denotes the number of map task slots of the data nodes that store the input data of the map task out of the plurality of the data nodes, and n(Rack Local Slots) is the number of map task slots of data nodes that do not store the input data of the map task out of the plurality of the data nodes; and
Empty Slots are slots that do not perform tasks in a data node, and n(Total Local Slots) is obtained by the Equation 6 below:

$$n(\text{Total Empty Slots}) = n(\text{Data Local Empty Slots}) + n(\text{Rack Local Empty Slots}) \quad [\text{Equation 6}]$$

where n(Data Local Empty Slots) denotes a number of empty slots that do not perform tasks among the map task slots of the data nodes that store the input data of the map task in the plurality of the data nodes, and n(Rack Local Empty Slots) denotes a number of empty slots that do not perform tasks among the map task slots of the data nodes that do not store the input data of the map task in the plurality of the data nodes.

14. The apparatus of claim 12, wherein the replication manager comprises a Data Local Job Probability (DLJP) calculator calculating a probability P(DLJ) that a map disk Data-Local-Map-Task (DLMT), which is allocated to the first map task slot of Data-Local-Map-Task-Slot out of the plurality of map tasks, occurs in a job having an i-number of map tasks, and wherein the probability P(DLJ) is calculated by using the Equation 7 below:

$$P(DLJ) = \frac{P(DLMT_{[1]} + DLMT_{[2]} + DLMT_{[3]} + \ldots + DLMT_{[i]})}{n(\text{Total Map Task})} = \frac{\sum_{i=0}^{n} P(DLMT_{[i]})}{n(\text{Total Map Task})} \quad [\text{Equation 7}]$$

where n(Total Map Task) denotes a total number of the map tasks of the plurality of the data nodes.

15. The apparatus of claim 13, wherein the replication manager comprises a Data Local Job Probability (DLJP) calculator calculating a probability P(DLJ) that a map disk Data-Local-Map-Task (DLMT), which is allocated to the first map task slot of Data-Local-Map-Task-Slot out of the plurality of map tasks, occurs in a job having an i-number of map tasks, and wherein the probability P(DLJ) is calculated by using the Equation 7 below:

$$P(DLJ) = \frac{P(DLMT_{[1]} + DLMT_{[2]} + DLMT_{[3]} + \ldots + DLMT_{[i]})}{n(\text{Total Map Task})} \quad \text{[Equation 7]}$$

$$= \frac{\sum_{i=0}^{n} P(DLMT_{[i]})}{n(\text{Total Map Task})}$$

where n(Total Map Task) denotes a total number of the map tasks of the plurality of the data nodes.

16. The apparatus of claim 14, wherein the dynamic data replica creator replicates data in real time using the probability P(DLJ), and schedules and allocates the map task to the second map task slot of Rack-Local-Map-Task-Slot when all of the first map task slots of Data-Local-Map-Task-Slots of the map task are performing tasks.

17. The apparatus of claim 11, wherein the replication manager comprises a replica eviction selector:
measuring a frequency of access to Data[i] using the Equation 8 below; measuring a frequency of access to all data of a Hadoop Distributed File System (HDFS) using the Equation 9 below; and
evicting a data replica when the frequency of access to the Data[i] is lower than the frequency of access to all data of the HDFS, wherein the Equation (8) is $$\text{Data}[i].\text{Access Frequency} = \frac{\text{Data}[i].\text{Access Count}}{\text{Data}[i].\text{Stored Time}}$$

where Data[i].AccessFrequency denotes the frequency of access to the Data[i], Data[i].StoredTime denotes a storage time of the Data[i], Data[i].AccessCount denotes a number of accesses to the Data[i], and i is a number of tasks; and
Equation 9 is $$\text{Data Access Frequency of } HDFS = \frac{\text{Total Data Access Count}}{HDFS \text{ Running Time}}$$

where Data.AccessFrequency of HDFS is the frequency of access to all data of the HDFS, HDFS RunningTime is an operating time of the HDFS, and Total Data Access Count is a number of accesses to all data of the HDFS.

\* \* \* \* \*